United States Patent [19]

Smith

[11] Patent Number: 5,397,561
[45] Date of Patent: Mar. 14, 1995

[54] ZEOLITE-TYPE MATERIAL

[75] Inventor: Warren J. Smith, Feltham, England

[73] Assignee: The British Petroleum Company P.l.C., London, England

[21] Appl. No.: 923,360

[22] Filed: Jul. 31, 1992

[30] Foreign Application Priority Data

Aug. 1, 1991 [GB] United Kingdom ................ 9116668

[51] Int. Cl.⁶ ............................................. C01B 33/26
[52] U.S. Cl. .................................. 423/704; 423/706; 423/718; 502/64
[58] Field of Search ............... 423/700, 706, 718, 704; 502/64

[56] References Cited

U.S. PATENT DOCUMENTS

| | | | |
|---|---|---|---|
| 3,950,496 | 4/1976 | Ciric | 502/64 |
| 4,241,036 | 12/1980 | Flanigen et al. | 423/329 |
| 4,851,200 | 7/1989 | Ryan | 423/118 |
| 4,973,461 | 11/1990 | Vaughan | 423/718 |

Primary Examiner—Anthony McFarlane
Attorney, Agent, or Firm—Fay, Sharpe, Beall, Fagan, Minnich & McKee

[57] ABSTRACT

A novel zeolite type material, designated SUZ-9 and suitable for use as an absorbent, catalyst or catalyst base, has, in its dehydrated organic free form, the empirical form m $(M_{2/a}O):X_zO_{xz/2}:yYO_2$, where m is 0.5–1.5, M is an a valent cation; x is 2 or 3 and z is correspondingly 1 or 2; y is at least 2; X is Al, Ga, B, Zn or Fe; and Y is Si or Ge, and in its calcined hydrogen form an X-ray diffraction pattern including significant specified peaks.

15 Claims, No Drawings

ZEOLITE-TYPE MATERIAL

BACKGROUND OF THE INVENTION

1. Field of the Invention

The present invention relates to a novel synthetic zeolite-type material and to a process for its preparation and use.

2. Description of the Prior Art

U.S. Pat. No. 3 950 496 describes the preparation of zeolite ZSM-18 using a synthesis gel which includes as a template the material 1,3,4,6,7,9-hexahydro-2,2,5,5,8,8-hexamethyl-2H-benzo[1,2-C:3,4-C'-5,6-C''] tripyrolium trihydroxide. We have now found that use of this template, optionally in admixture with a further nitrogen-containing template can produce a novel zeolite-type material.

SUMMARY OF THE INVENTION

The present invention provides a zeolite-type material having, in the dehydrated organic-free form, the empirical formula:

$$m(M_{2/a}O : X_zO_{xz/2} : yYO_2) \quad (I)$$

in which m is 0.5 to 1.5; M is a cation of valency a; x is 2 or 3; X is a metal of valency x selected from aluminium, gallium, boron, zinc and iron; z is 2 when x is 3 and z is 1 when x is 2; y is at least 2; and Y is silicon or germanium; and having, in the calcined hydrogen form, an X-ray diffraction pattern including significant peaks substantially as shown in Table 1 herein.

The material according to the invention is referred to herein as SUZ-9.

Preferably X is gallium or, especially, aluminium. Preferably Y is silicon. The material may contain more than one metal X, and/or both silicon and germanium. When X is aluminium and Y is silicon, the material is an aluminosilicate, or zeolite. Preferably in formula I, m is 0.6–1.3 and y is 2–15 especially 3–9.5 in particular 4–7.6. Particularly preferred are those zeolite-type materials in which at least one M is an alkali metal having an atomic number of at least 19, e.g. potassium, rubidium and/or caesium, in particular those in which M is potassium or is a mixture of potassium and sodium, especially with an atom ratio of 2:98 to 50:50 such as 5:95–20:80.

As is common in this field, it should be understood that in addition to the elements represented in the general formula I, the material may be hydrated by water in addition to any water notionally present when M is hydrogen. The material may also include occluded or adsorbed materials such as nitrogenous materials originally present in the synthesis mixture or resulting from reaction of materials originally present. Further, the material may contain more cations M than necessary to balance the charge associated with metal X. This phenomenon is described, for example, in J. Chem. Soc. Chem. Commun., 1985, pp. 289–290. All such materials should be understood to be within the scope of the invention.

The cation M may for example be selected from $H^+$, ammonium, alkali metal cations, alkaline earth metal cations, aluminium cations, gallium cations and mixtures thereof. The cations present in the material as initially prepared will of course depend on the substances present in the synthesis gel, and may include organic containing cations. Commonly, an alkali metal, especially sodium and/or potassium, will be present, possibly along with cations of organic nitrogen-containing materials. Those cations initially present may if desired be replaced either wholly or partially by other cations e.g. hydrogen ions or metal cations, using conventional ion exchange techniques. The hydrogen form (i.e. $M = H^+$) may be produced by known methods such as acid exchange or ammonium exchange followed by a thermal treatment, or a combination of the two. For many applications, it may be useful to produce SUZ-9 in the calcined hydrogen form.

Occluded or adsorbed materials may if desired be removed by thermal and/or chemical techniques.

DESCRIPTION OF THE PREFERRED EMBODIMENT

The material SUZ-9 may be prepared by reacting together under aqueous alkaline conditions the following materials: a source of oxide $YO_2$; a source of oxide $X_zO_{xz/2}$; a source of $M(OH)_a$; water; 1,3,4,6,7,9-hexahydro-2,2,5,5,8,8-hexamethyl-2H-benzo[1,2-C:3,4-C'-5,6-C''] tripyrolium trihydroxide or halide or its precursor or reaction product (hereafter also called the tripyrolium compound); and preferably tetraethylammonium hydroxide or halide or its precursor or reaction product; The reaction mixture preferably has components in the following molar ratios: $YO_2/X_zO_{xz/2}$ = at least 3, preferably at least 5, preferably less than 100, especially 5 to 60, most preferably 5 to 30; $H_2O/YO_2$ = 5 to 500, preferably 10 to 50 and especially 10–30; $OH^-/YO_2$ = less than 1.5, preferably less than 1.0, preferably at least 0.1, especially 0.1 to 0.8; tetraethylammonium compound plus 1,3,4,6,7,9-hexahydro-2,2,5,5,8,8-hexamethyl-2H-benzo [1,2-C:3,4-C'-5,6-C''] tripyrolium trihydroxide compound/$YO_2$ = 0.01 to 2.0 especially 0.05 to 1.0. The reaction mixture preferably has a molar ratio of the tripyrolium compound/$YO_2$ = 0.01–0.10 especially 0.03–0.10. The reaction mixture also preferably hs components in at least some of the following molar ratios with respect to $X_zO_{xz/2}$:$M_{2/a}O$ 1–10 e.g. 1.5–10 especially 1.5–6.5, $K_2O$ 0.5–8 especially 0.5–5, $Na_2O$ substantially 0 or 0.5–5, especially 0.5–2, $H_2O$ 100–700 especially 200–490, and total of the tripyrolium compound and tetraethyl ammonium compound (when present) 0.1–5 e.g. 1–4, tripyrolium compound 0.1–1.0 especially 0.3–0.9, tetra ethylammonium compound (when present) 0.1–10 especially 1–6. The reaction conditions are selected and maintained such as to produce crystals of SUZ-9. $OH^-$ should be understood to be defined as follows:

a[(no. of moles of $M(OH)_a$)-(no. of moles of $M(OH)_a$ associated with $X_zO_{xz/2}$)]

Following synthesis, it is possible to adjust the value of y by conventional chemical techniques. For example, y may be increased by treatment with acid, silicon tetrachloride, ammonium hexafluorosilicate or a combination of steaming and ammonium ion exchange. All these treatments tend to remove element X from the framework. y may be reduced by treatment with, for example, sodium aluminate or gallate, or similar treatments which introduce X into the framework.

The source of oxide $YO_2$ may for example be fumed silica, sodium silicate, silicic acid, precipitated silica, colloidal silica, or the germanium equivalent. It is preferably fumed silica.

The source of oxide $X_zO_{xz/2}$, may be an aluminium salt, aluminium hydroxide, aluminium oxide, or a metal aluminate; or the equivalent for other metals X. The use of a metal aluminate, especially sodium aluminate, is preferred.

The source of M(OH)$_a$ may for example be an alkali or alkaline earth metal hydroxide, for example sodium, potassium, magnesium or calcium hydroxide. A mixture of different materials, for example sodium hydroxide plus potassium hydroxide, may be used. It is especially preferred that the reaction mixture contains an alkali metal with atomic number of at least 19, e.g. as described for M above, in particular potassium, or a mixture of potassium and sodium, especially with a total atom ratio from any sources in the reaction mixtures, e.g. whether added as hydroxide and/or aluminate, of 10:90 to 90:10 such as 90:10 to 40:60.

The process for the preparation of material SUZ-9 includes the presence of a template comprising 1,3,4,6,7,9-hexahydro-2,2,5,5,8,8-hexamethyl-2H-benzo[1,2-C:3,4-C':5,6-C''] tripyrolium trihydroxide or its precursor or reaction product, and preferably also tetraethylammonium hydroxide or halide or its precursor or reaction product. The process may involve in situ reaction of the template or templates to form active species during the preparation of SUZ-9 and hence reaction products of the template or templates may also be used. Similarly precursors for the template or templates or the active species may be used. The molar ratio of tetraethylammonium compound/1,3,4,6,7,9-hexahydro2,2,5,5,8,8-hexamethyl-2H-benzo[1,2-C:3,4-C'-5,6-C''] tripyrolium trihydroxide compound is preferably in the range of from 1:1 to 20:1, especially 1:1 to 10:1.

The reaction mixture is maintained under crystallisation conditions until crystals of the desired product SUZ-9 are formed. In general, a reaction temperature of from 80° to 200° C. under autogenous pressure is suitable, and an optimum reaction time can be determined by monitoring the course of the reaction.

As is common in zeolite synthesis the precise way in which the reaction is carried out will affect the end product. Particular combinations of parameters may be used to optimise the yield of SUZ-9. Such optimisation is a routine part of zeolite synthesis. The novel product SUZ-9 may under some circumstances be co-produced with other crystalline materials. Particular reaction conditions which lead to the production of SUZ-9 are given in the Examples herein.

Material SUZ-9 has a variety of potential applications particularly as a catalyst or adsorbent. As is common in the field of zeolites and zeolite-type materials, it may be used in a number of purifications or separations, and a number of catalytic conversions, for example the conversion of hydrocarbons and oxygenates into other products including reforming, cracking hydrocracking, alkylation, e.g. with n and isobutene, hydroisomerization and dewaxing e.g. of lube oil. Examples of cracking are of hydrocarbons into other hydrocarbons of lower molecular weight, such as linear alkanes e.g. of 6–30 carbons to mixtures of olefins and alkanes, and cracking of gas oil and residual oil to lighter oils; temperatures of 300°–500° C. may be used. For example, among hydrocarbon conversions are conversions of a linear olefin such as a C$_{4-6}$ linear olefin, e.g. butene-1 into a branched olefin, e.g. a branched olefin mixture comprising a majority having at least 5 carbons; the dimerization and/or oligomerization of olefins; and the reactions of at least one olefin, e.g. of 3–20 carbons with a reactive, usually organic, compound. Examples of such a compound are carbon monoxide, usually mixed with hydrogen, in order to form alcohols, and are also aromatic hydrocarbons, such as ones, e.g. of 6–10 carbons, preferably benzene or toluene to form an alkylated compound, and are also oxygenates, especially methanol, dimethyl ether and/or formaldehyde to form higher olefins. The conversion of methanol into hydrocarbons, especially those of 2–4 carbons and/or at least 5 carbons, and the alkylation of the aromatic hydrocarbons with said oxygenate to form alkylated aromatic reaction product may also be performed over the zeolite-type material as may the reaction of formaldehyde and acetic acid to form acrylic acid. Examples of suitable conditions for these conversions are passage of the feedstock alone with at least one inert gaseous component, such as nitrogen or other inert gas, or an alkane such as butene, at 200°–600° C. over the catalyst, optionally after activation or regeneration with a gas containing molecular oxygen such as air, or thermal activation in the presence of hydrogen. Pressures of about atmospheric may be used, e.g. with the conversion of methanol and its reaction with aromatic hydrocarbon and production of acrylic acid and conversion of linear to branched olefins, while higher pressures, e.g. of 0.2–10 MPa absolute may be used, e.g. for conversion of olefins to alcohols.

In addition to intrinsic activity of the zeolite type material conferred by its porous crystalline structure, it may also be subjected to exchange or impregnation with an element suitable for imparting a specific type of catalytic activity. Metal or non metal compounds which may be used for ion exchange and/or impregnation may for example be compounds of any one of the following elements, namely those belonging to Groups IB, IIA, IIB, IIIA, IIIB, IVA, IVB, VB, VIA, VIIA and VIII according to the Periodic Table due to Mendeleef. Specifically, compounds of copper, silver, zinc, aluminium, gallium, indium, thallium, lead, phosphorus, antimony, bismuth, chromium, molybdenum, tungsten, manganese, rhenium, iron, cobalt, nickel, ruthenium, rhodium, palladium, osmium, iridium, platinum are preferred.

For use as a catalyst, the zeolite-type material may, if desired, be bound in a suitable binding material. The binder may suitably be one of the conventional alumina, silica, clay or aluminophosphate binders or a combination of binders. Amounts of binder to total of binder and zeolite-type material may be up to 90% e.g. 10–90% by weight. If desired other known zeolites may be present, with or without the binder.

Throughout this Specification, it should be understood that reference to an X-ray diffraction pattern indicates a powder diffraction pattern obtained on a conventional fixed-slit X-ray diffractometer using copper K-alpha radiation. Table 1 gives the positions of significant peaks present in the XRD of fully calcined SUZ-9 in the hydrogen form. It should be understood that the complete XRD's may contain weak peaks in addition to those listed in the Table. In addition, where peaks are close together, two or more peaks may, through lack of resolution, appear as a single peak. It will also be understood that the intensities of the peaks can vary widely depending on a number of factors, notably the presence of non-framework materials. The presence of water or nitrogenous materials present in or resulting from the original synthesis gel, may alter the relative intensities of the peaks at different d-spacings. Other factors which can affect the details of the XRD include the molar ratio of X to Y and the particle size and morphology of the sample. It will be appreciated that the XRD patterns presented in the Examples hereinafter are those actually obtained from various samples of calcined and uncalcined SUZ-9. Data were collected on a Philips PW 1820 diffractometer using ¼°, 0.2 mm, ¼° fixed slits, scanning from 4° to either 32 or 36° 2-theta in 0.025° steps. Theta is the Bragg angle; I is the intensity of a peak; and $I_o$ is the intensity of the strongest peak. Philips APD 1700 processing software was used to determine d-spacings (in angstrom units) and relative intensities ($100 \times I/I_o$) with copper radiation, copper K-alpha one wavelength=1.54056 Angstroms.

The following Examples illustrate the invention.

The following reagents were used in the preparation of SUZ-9. Sodium Aluminate ex BDH 40 wt % $Al_2O_3$, 30 wt % $Na_2O$, 30 wt % $H_2O$ (in Ex 2–4). Sodium aluminate 61.3 wt % $Al_2O_3$, 37.8% wt $Na_2O$ (for Ex 5).

Sodium Hydroxide ex FSA

Distilled Water

Tetraethylammonium Hydroxide ex Fluka (40 wt % in water) (For Ex 1–4). Fumed Silica (Cab-O-Sil, M5) ex BDH 1,3,4,6,7,9-hexahydro-2,2,5,5,8,8-hexamethyl-2H-benzo[1,2-C:3,4-C'-5,6-C"] tripyrolium trihydroxide (referred to as TRISQUAT) (50 wt % in water) for Ex 2–4 and 25.7 wt % in water for Ex 5).

Potassium Hydroxide ex FSA

EXAMPLE 1

Preparation of TRISQUAT 1,3,4,6,7,9-hexahydro-2,2,5,5,8,8-hexamethyl-2H-benzo[1,2-C:3,4-C'-5,6-C"] tripyrolium trihydroxide, was prepared by the method of U.S. Pat. No. 3950496. It has the structure:

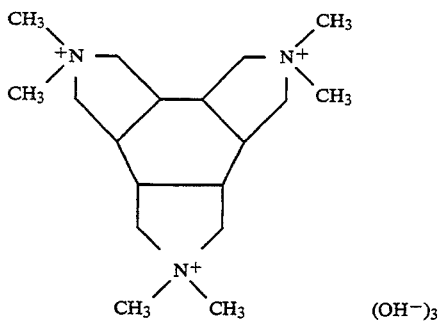

The hexabromomethylbenzene precursor was prepared by the method of A. D. U. Hardy et al, J. Chem. Soc. Perkin II, 1979, 1013.

EXAMPLE 2

(a) 5.71 g of potassium hydroxide was dissolved in 65.00 g of distilled water and then added to 14.24 g of fumed silica with stirring. 21.81 g of tetraethylammonium hydroxide and 6.70 g of TRISQUAT solution were added to the silica gel with vigorous stirring. The resultant gel was then added to a solution of 3.00 g sodium aluminate dissolved in 20.0 g of distilled water and stirred vigorously. The reaction mixture was stirred for a further 1½ hours. The reaction mixture had the following composition:

20.1 $SiO_2$—$Al_2O_3$—1.2 $Na_2O$—4.3 $K_2O$ —5.0 TEAOH—0.8 TRISQUAT—483.9 $H_2O$

TEAOH=tetraethylammonium hydroxide

The reaction mixture was loaded into a pressure vessel of 150 cm³ volume and heated at 135° C. for 116 hours. The pressure vessel was revolved during the reaction. At the end of this period the pressure vessel was cooled to room temperature and the contents filtered. The solid product was washed with distilled water and dried at 100° C. Analysis of the product gave the following molar composition 7.4 $SiO_2$.$Al_2O_3$.$K_2O$.0.1 $Na_2O$ Analysis by X-ray diffraction identified the product as SUZ-9, the X-ray diffraction pattern is shown in Table 2(a).

(b) The material produced from Example 2(a) was calcined in air for 16 hours at 550° C. The X-ray diffraction pattern of the calcined material is shown in Table 2(b).

The sorption capacities of the calcined SUZ-9 for n-hexane, toluene and cyclohexane were 6.8 wt %, 5.3 wt % and 3.1 wt % respectively (P/Po=0.6, T=25° C.).

EXAMPLE 3

2.86 g of potassium hydroxide was dissolved in 65.00 g of distilled water and then added to 14.24 g of fumed silica with stirring. 21.81 g of tetraethylammonium hydroxide and 9.3 g of TRISQUAT solution were added to the silica gel with stirring. The resultant mixture was added to a solution containing 6.0 g of sodium aluminate dissolved in 20.00 g of distilled water. The reaction mixture was stirred for 1 hour. The reaction mixture had the following molar composition:

10.0 $SiO_2$—$Al_2O_3$—1.2 $Na_2O$—1.1 $K_2O$—2.5 TEAOH—0.6 TRISQUAT—247 $H_2O$

The reaction mixture was loaded into a 150 cm³ volume pressure vessel and heated at 135° C. for 184 hours. The pressure vessel was revolved during the reaction. At the end of this period the pressure vessel was cooled down to room temperature and the contents filtered. The solid product was washed with distilled water and dried at 100° C. Analysis of the product gave the following composition:

5.6 $SiO_2$—$Al_2O_3$—0.7 $K_2O$

The solid was calcined in air for 16 hours at 550° C. 6.2 g of the calcined material was refluxed with 120 ml of 1.5M ammonium nitrate solution at 80° C. for 3 hours. This procedure was repeated two more times with intermediate washing with distilled water. The ammonium form zeolite was then calcined in air at 400° C. for 5 hours to produce the hydrogen form. The X-ray diffraction pattern of the calcined hydrogen form SUZ-9 is shown in Table 4.

EXAMPLE 4

A reaction mixture was prepared in exactly the same manner as Example 2 and stirred for 3½ hours. The reaction mixture was loaded into a 150 cm³ pressure vessel and heated at 135° C. for 188 hours. At the end of this period the pressure vessel was cooled to room temperature and the contents filtered. The solid product was washed with distilled water and dried at 100° C. It was then calcined and a portion converted into the calcined hydrogen form in the manner described in Ex 3 and the X-ray diffraction pattern of the calcined hydrogen form SUZ9 is shown in Table 3.

EXAMPLE 5

12.68 g of Trisquat solution was mixed with 40.00 g of distilled water and then added to 9.50 g of fumed silica with vigerous stirring. The resultant mixture was added to a solution containing 2.6 g of sodium aluminate and 4.11 g of potassium hydroxide dissolved in 20.2 g of distilled water. The reaction mixture was stirred for 1.5 hours. The reaction mixture had the following molar composition:

10.1 $SiO_2$—$Al_2O_3$—$Na_2O$—2.3 $K_2O$—0.6 TRISQUAT—247.9 $H_2O$

The reaction mixture was loaded into a 50 $cm^3$ pressure vessel nd heated at 135° C. for 93 hours. The pressure vessel was not agitated during the reaction. At the end of this period the pressure vessel was cooled down to room temperature and the contents filtered. The solid product was washed with distilled water and dried at 100° C. Analysis of the product gave the following composition:

6.6 $SiO_2$—$Al_2O_3$—0.9 $K_2O$

The product was calcined as in Ex. 3 and a portion converted into the calcined hydrogen form in the manner described in Ex 3 but with a 0.5 g solid treated with 50 ml of the ammonium nitrate solution and the calcination of the ammonium form zeolite at 550° C. in air for 3 hours. The Xray diffraction pattern of the calcined hydrogen form SUZ9 is shown in Table 5.

EXAMPLE 6

The catalytic activity of the calcined hydrogen form of the SUZ-9 of Example 3 was tested in the cracking of a hydrocarbon. The calcined hydrogen SUZ-9 was pelleted and crushed to pass through 600 micron but not 250 micron sieves. 2.0 g (5.0 ml) of this material was loaded into a quartz reactor and heat activated in flowing air (flow rate 100 ml/min) by raising the temperature of the catalyst at 4° C. per min up to 550° C., at which temperature it remained for 16 hr. The catalyst was then allowed to cool to 400° C. before being tested for the catalytic conversion of n-dodecane at 40° C. n Dodecane was converted at a WHSV of 4.5 in the presence of nitrogen carrier gas (flow rate of 79 ml/min measured at 25° C.); WHSV stands for weight of dodecane fed per hour/weight of catalyst. After 30 mins on stream the conversion of n-dodecane was 13.3% and the product carbon molar selectivities, defined as the % carbon molar yield of each component/total carbon molar conversion, were C1-4 alkanes (21.5%), C2-4 alkenes (38.3%) and C5-11 alkanes/alkenes (40.2%).

TABLE 1

| X-ray Diffraction Pattern of SUZ-9, Calcined Hydrogen Form | |
|---|---|
| d (Å) | Relative Intensity |
| 15.66 ± 0.30 | VS |
| 11.89 ± 0.25 | W |
| 10.46 ± 0.25 | M |
| 9.04 ± 0.15 | VW |
| 7.85 ± 0.15 | M |
| 7.55 ± 0.15 | M/S |
| 6.97 ± 0.15 | VW |
| 6.32 ± 0.12 | W/M |
| 6.13 ± 0.12 | M/S |
| 5.92 ± 0.12 | S |
| 5.80 ± 0.12 | M |
| 5.63 ± 0.12 | M |
| 5.44 ± 0.12 | W/M |
| 5.22 ± 0.12 | M |
| 5.07 ± 0.12 | VW/W |
| 4.48 ± 0.10 | S |
| 4.35 ± 0.10 | S |
| 4.26 ± 0.10 | M/S |
| 3.86 ± 0.08 | M |

TABLE 1-continued

| X-ray Diffraction Pattern of SUZ-9, Calcined Hydrogen Form | |
|---|---|
| d (Å) | Relative Intensity |
| 3.78 ± 0.08 | W/M |
| 3.67 ± 0.08 | W/M |
| 3.60 ± 0.08 | M/S |
| 3.55 ± 0.08 | VS |
| 3.49 ± 0.07 | W/M |
| 3.42 ± 0.07 | W/M |
| 3.35 ± 0.07 | M |
| 3.30 ± 0.07 | M |
| 3.25 ± 0.07 | W/M |
| 3.21 ± 0.07 | W/M |
| 3.14 ± 0.07 | S |
| 3.06 ± 0.07 | M |
| 3.02 ± 0.07 | S |
| 2.89 ± 0.06 | M/S |
| 2.86 ± 0.06 | W |
| 2.78 ± 0.06 | W |
| 2.73 ± 0.06 | VW/W |
| 2.64 ± 0.06 | VW/W |
| 2.59 ± 0.06 | W/M |
| 2.52 ± 0.06 | VW/W |

VS = 60–100
S = 40–60
M = 20–40
W = 10–20
VW < 10

TABLE 2 (a)

| XRD of Product Obtained in Example 2 (a) | | |
|---|---|---|
| 2 Theta | d (Å) | Relative Intensity |
| 5.62 | 15.72 | 100 |
| 7.43 | 11.88 | 8 |
| 8.43 | 10.48 | 26 |
| 9.77 | 9.05 | 1 |
| 11.24 | 7.87 | 8 |
| 11.73 | 7.54 | 39 |
| 14.07 | 6.29 | 13 |
| 14.44 | 6.13 | 21 |
| 14.91 | 5.94 | 21 |
| 15.26 | 5.80 | 9 |
| 15.67 | 5.65 | 24 |
| 16.27 | 5.44 | 6 |
| 16.90 | 5.24 | 6 |
| 17.53 | 5.06 | 4 |
| 18.42 | 4.81 | 2 |
| 19.73 | 4.50 | 48 |
| 20.34 | 4.36 | 36 |
| 20.63 | 4.30 | 24 |
| 20.83 | 4.26 | 12 |
| 23.02 | 3.86 | 45 |
| 23.55 | 3.77 | 4 |
| 24.26 | 3.67 | 13 |
| 24.74 | 3.60 | 24 |
| 25.07 | 3.55 | 76 |
| 25.37 | 3.51 | 15 |
| 26.00 | 3.42 | 14 |
| 26.93 | 3.31 | 21 |
| 27.80 | 3.21 | 15 |
| 27.86 | 3.20 | 15 |
| 28.39 | 3.14 | 33 |
| 29.16 | 3.06 | 19 |
| 29.50 | 3.03 | 34 |
| 30.93 | 2.89 | 35 |

TABLE 2 (b)

| XRD of Calcined Material Obtained in Example 2 (b) | | |
|---|---|---|
| 2 Theta | d (Å) | Relative Intensity |
| 5.57 | 15.85 | 100 |
| 7.38 | 11.97 | 12 |
| 8.39 | 10.53 | 30 |
| 9.68 | 9.13 | 9 |
| 11.20 | 7.90 | 15 |
| 11.71 | 7.55 | 55 |
| 14.00 | 6.32 | 18 |
| 14.44 | 6.13 | 32 |
| 14.85 | 5.96 | 24 |

TABLE 2 (b)-continued

XRD of Calcined Material Obtained in Example 2 (b)

| 2 Theta | d (Å) | Relative Intensity |
|---|---|---|
| 15.23 | 5.81 | 10 |
| 15.63 | 5.67 | 27 |
| 16.24 | 5.46 | 7 |
| 16.86 | 5.26 | 12 |
| 17.44 | 5.08 | 3 |
| 18.42 | 4.81 | 3 |
| 19.69 | 4.51 | 57 |
| 20.29 | 4.37 | 32 |
| 20.58 | 4.31 | 19 |
| 20.78 | 4.27 | 12 |
| 22.99 | 3.87 | 44 |
| 23.52 | 3.78 | 7 |
| 24.27 | 3.66 | 22 |
| 24.76 | 3.59 | 30 |
| 25.08 | 3.55 | 92 |
| 25.97 | 3.43 | 17 |
| 26.91 | 3.31 | 26 |
| 27.83 | 3.20 | 12 |
| 28.28 | 3.15 | 37 |
| 28.43 | 3.14 | 35 |
| 29.12 | 3.06 | 24 |
| 29.42 | 3.03 | 51 |
| 30.90 | 2.89 | 46 |

TABLE 3

XRD of Product Obtained in Example 4, Calcined Hydrogen Form

| 2 Theta | d (Å) | Relative Intensity |
|---|---|---|
| 5.64 | 15.66 | 89 |
| 7.43 | 11.89 | 14 |
| 8.45 | 10.46 | 35 |
| 9.77 | 9.04 | 1 |
| 11.27 | 7.84 | 29 |
| 11.72 | 7.55 | 43 |
| 12.70 | 6.97 | 5 |
| 14.00 | 6.32 | 16 |
| 14.45 | 6.13 | 42 |
| 14.95 | 5.92 | 52 |
| 15.26 | 5.80 | 26 |
| 15.72 | 5.63 | 29 |
| 16.29 | 5.44 | 17 |
| 16.98 | 5.22 | 26 |
| 17.48 | 5.07 | 6 |
| 19.81 | 4.48 | 53 |
| 20.41 | 4.35 | 50 |
| 20.86 | 4.26 | 39 |
| 23.05 | 3.86 | 35 |
| 23.54 | 3.78 | 21 |
| 24.21 | 3.67 | 22 |
| 24.72 | 3.60 | 40 |
| 25.06 | 3.55 | 100 |
| 25.50 | 3.49 | 22 |
| 26.04 | 3.42 | 17 |
| 26.61 | 3.35 | 29 |
| 26.98 | 3.30 | 36 |
| 27.40 | 3.25 | 22 |
| 27.80 | 3.21 | 17 |
| 28.43 | 3.14 | 60 |
| 29.18 | 3.06 | 29 |
| 29.56 | 3.02 | 50 |
| 30.93 | 2.89 | 41 |
| 31.28 | 2.86 | 13 |

TABLE 4

XRD of Product of Example 3, calcined hydrogen form

| 2 Theta | d (Å) | Relative Intensity |
|---|---|---|
| 4.88 | 18.09 | 9 |
| 5.59 | 15.80 | 87 |
| 7.41 | 11.92 | 11 |
| 8.41 | 10.51 | 28 |
| 11.22 | 7.87 | 30 |
| 11.68 | 7.57 | 44 |
| 12.67 | 6.98 | 5 |
| 13.98 | 6.32 | 23 |
| 14.41 | 6.13 | 44 |
| 14.88 | 5.95 | 43 |
| 15.22 | 5.82 | 25 |
| 15.69 | 5.64 | 25 |
| 16.23 | 5.46 | 17 |
| 16.93 | 5.23 | 25 |
| 17.43 | 5.09 | 6 |
| 19.73 | 4.50 | 49 |
| 20.34 | 4.36 | 46 |
| 20.81 | 4.27 | 29 |
| 22.04 | 4.03 | 8 |
| 22.81 | 3.89 | 26 |
| 23.00 | 3.86 | 29 |
| 23.48 | 3.79 | 20 |
| 24.16 | 3.69 | 23 |
| 24.65 | 3.61 | 38 |
| 24.99 | 3.56 | 100 |
| 25.47 | 3.50 | 22 |
| 25.98 | 3.43 | 17 |
| 26.57 | 3.35 | 24 |
| 26.90 | 3.31 | 29 |
| 27.33 | 3.26 | 18 |
| 28.35 | 3.15 | 57 |
| 29.05 | 3.07 | 27 |
| 29.50 | 3.03 | 47 |
| 30.82 | 2.90 | 35 |
| 31.20 | 2.87 | 11 |
| 31.98 | 2.80 | 10 |
| 32.69 | 2.74 | 8 |
| 33.91 | 2.64 | 10 |
| 34.30 | 2.61 | 14 |
| 34.56 | 2.59 | 13 |

TABLE 5

XRD of Product of Example 5 in calcined H Form

| 2 Theta | d (Å) | Relative Intensity |
|---|---|---|
| 4.82 | 18.33 | 9 |
| 5.59 | 15.81 | 100 |
| 7.38 | 11.97 | 12 |
| 8.39 | 10.53 | 27 |
| 9.72 | 9.10 | 6 |
| 11.24 | 7.87 | 20 |
| 11.65 | 7.59 | 21 |
| 12.25 | 7.22 | 3 |
| 13.84 | 6.40 | 7 |
| 14.42 | 6.14 | 19 |
| 14.91 | 5.94 | 27 |
| 15.22 | 5.82 | 12 |
| 15.70 | 5.64 | 14 |
| 16.25 | 5.45 | 9 |
| 16.97 | 5.22 | 14 |
| 17.45 | 5.08 | 4 |
| 19.81 | 4.48 | 20 |
| 20.37 | 4.36 | 27 |
| 20.82 | 4.26 | 12 |
| 22.06 | 4.03 | 4 |
| 23.06 | 3.85 | 14 |
| 23.50 | 3.78 | 6 |
| 24.24 | 3.67 | 11 |
| 24.68 | 3.60 | 15 |
| 25.04 | 3.55 | 37 |
| 25.48 | 3.49 | 14 |
| 26.09 | 3.41 | 8 |
| 26.65 | 3.34 | 11 |
| 26.97 | 3.30 | 11 |
| 27.41 | 3.25 | 8 |
| 28.43 | 3.14 | 25 |
| 29.18 | 3.06 | 13 |
| 29.60 | 3.02 | 20 |
| 30.95 | 2.89 | 13 |

The Xray diffraction results in Table 5 show that the product has the structure of SUZ-9 as shown in the XRD in Table 1, because the reflections are in the same position and most of the reflections have the same intensities relative to each other as those in Table 1. Differences in relative intensity in Table 5 may be due to the fact that the crystals of the calcined H form product of Example 5 are cylindrical and are considerably longer than those of Examples 2–4. They are therefore more susceptible to preferred orientation in the XRD sample holder, causing certain reflections to be stronger.

I claim:

1. A compound having, in the dehydrated organic free form, the empirical formula:

$$m(M_{2/a}O):X_zO_{xz/2}:yYO_2 \qquad (I)$$

in which m is 0.5 to 1.5; M is a cation of valency a; x is 2 or 3; X is a metal of valency x selected from the group consisting of aluminium, gallium, boron, zinc and iron; z is 2 when x is 3 and z is 1 when x is 2; y is at least 2; and Y is is silicon or germanium; and having, in the calcined hydrogen form, an X-ray diffraction pattern including significant peaks substantially as follows

| d(A) | Relative Intensity |
|---|---|
| 15.66 ± 0.30 | VS |
| 11.89 ± 0.25 | W |
| 10.46 ± 0.25 | M |
| 9.04 ± 0.15 | VW |
| 7.85 ± 0.15 | M |
| 7.55 ± 0.15 | M/S |
| 6.97 ± 0.15 | VW |
| 6.32 ± 0.12 | W/M |
| 6.13 ± 0.12 | M/S |
| 5.92 ± 0.12 | S |
| 5.80 ± 0.12 | M |
| 5.63 ± 0.12 | M |
| 5.44 ± 0.12 | W/M |
| 5.22 ± 0.12 | M |
| 5.07 ± 0.12 | VW/W |
| 4.48 ± 0.10 | S |
| 4.35 ± 0.10 | S |
| 4.26 ± 0.10 | M/S |
| 3.86 ± 0.08 | M |
| 3.78 ± 0.08 | W/M |
| 3.67 ± 0.08 | W/M |
| 3.60 ± 0.08 | M/S |
| 3.55 ± 0.08 | VS |
| 3.49 ± 0.07 | W/M |
| 3.42 ± 0.07 | W/M |
| 3.35 ± 0.07 | M |
| 3.30 ± 0.07 | M |
| 3.25 ± 0.07 | W/M |
| 3.21 ± 0.07 | W/M |
| 3.14 ± 0.07 | S |
| 3.06 ± 0.07 | M |
| 3.02 ± 0.07 | S |
| 2.89 ± 0.06 | M/S |
| 2.86 ± 0.06 | W |
| 2.78 ± 0.06 | W |
| 2.73 ± 0.06 | VW/W |
| 2.64 ± 0.06 | VW/W |
| 2.59 ± 0.06 | W/M |
| 2.52 ± 0.06 | VW/W |

2. A compound as claimed in claim 1, in which X is aluminium.

3. A compound as claimed in claim 1 in which Y is silicon.

4. A compound as claimed in claim 1, in the calcined hydrogen form.

5. A compound as claimed in claim 1 in which M is potassium or a mixture of potassium and sodium.

6. A compound as claimed in claim 2, in which Y is silicon and M is potassium or a mixture of potassium and sodium.

7. A process for the preparation of a compound which comprises reacting together under aqueous alkaline conditions a source of oxide $YO_2$; water; a source of oxide $X_zO_{xz/2}$; and a source of M(OH)a; 1,3,4,5,7,9-hexahydro-2,2,5,5,8,8-hexamethyl-2H-benzo (1,2-C:3,4-C'-5,6-C'') tripyrolium trihydroxide; the reaction conditions being selected and maintained such as to produce a compound having, in the dehydrated organic free form, the empirical formula:

$$m(M_{2/a}O):X_zO_{xz/2}:yYO_2 \qquad (I)$$

in which m is 0.5 to 1.5; M is a cation of valency a; x is 2 or 3; X is a metal of valency x selected from the group consisting of aluminum, gallium, boron, zinc and iron; z is 2 when x is 3 and z is 1 when x is 2; y is at least 2; and Y is silicon or germanium; and having, in the calcined hydrogen form, an X-Ray diffraction pattern including significant peaks substantially as follows:

| d(A) | Relative Intensity |
|---|---|
| 15.66 ± 0.30 | VS |
| 11.89 ± 0.25 | W |
| 10.46 ± 0.25 | M |
| 9.04 ± 0.15 | VW |
| 7.85 ± 0.15 | M |
| 7.55 ± 0.15 | M/S |
| 6.97 ± 0.15 | VW |
| 6.32 ± 0.12 | W/M |
| 6.13 ± 0.12 | M/S |
| 5.92 ± 0.12 | S |
| 5.80 ± 0.12 | M |
| 5.63 ± 0.12 | M |
| 5.44 ± 0.12 | W/M |
| 5.22 ± 0.12 | M |
| 5.07 ± 0.12 | VW/W |
| 4.48 ± 0.10 | S |
| 4.35 ± 0.10 | S |
| 4.26 ± 0.10 | M/S |
| 3.86 ± 0.08 | M |
| 3.78 ± 0.08 | W/M |
| 3.67 ± 0.08 | W/M |
| 3.60 ± 0.08 | M/S |
| 3.55 ± 0.08 | VS |
| 3.49 ± 0.07 | W/M |
| 3.42 ± 0.07 | W/M |
| 3.35 ± 0.07 | M |
| 3.30 ± 0.07 | M |
| 3.25 ± 0.07 | W/M |
| 3.21 ± 0.07 | W/M |
| 3.14 ± 0.07 | S |
| 3.06 ± 0.07 | M |
| 3.02 ± 0.07 | S |
| 2.89 ± 0.06 | M/S |
| 2.86 ± 0.06 | W |
| 2.78 ± 0.06 | W |
| 2.73 ± 0.06 | VW/W |
| 2.64 ± 0.06 | VW/W |
| 2.59 ± 0.06 | W/M |
| 2.52 ± 0.06 | VW/W |

8. A process as claimed in 7 in which the reaction mixture comprises at least one alkali metal of atomic number of at least 19.

9. A process as claimed in claim 8 in which the reaction mixture comprises potassium or a mixture of potassium and sodium.

10. A process as claimed in claim 7 in which the reaction mixture also comprises tetraethyl ammonium hydroxide or halide.

11. A process as claimed in claim 7 in which in the reaction mixture the $M_2O/X_zO_{xz/2}$ molar ratio is 1.5 to 10.

12. A process as claimed in claim 7, wherein said compound is in the calcined hydrogen form.

13. A process as claimed in claim 10 in which the reaction mixture has components in the following molar ratios: $YO_2/X_2O_{xz}/2$ = at least 3; $H_2O/YO_2$ = 5 to 500; $OH^-/YO_2$ = less than 1.5; tetraethylammonium compound plus 1,3,4,6,7,9-hexahydro-2,2,5,5,8,8-hexamethyl-2H-benzo(1,2-C:3,4-C′-5,6-C″) tripyrolium trihydroxide compound/$YO_2$ = 0.01 to 2.0.

14. A process as claimed in claim 13, in which X is aluminum, Y is silicon, and M is potassium or a mixture of potassium and sodium.

15. A process as claimed in claim 13, in which the reaction mixture has components in the following molar ratios:

$YO_2/X_zO_{xz}/2$ = 5 to 30; $H_2O/YO_2$ = 10 to 50; $OH^-/YO_2$ = 0.1 to 0.8; tetraethylammonium compound plus 1,3,4,6,7,9-hexahydro-2,2,5,5,8,8-hexamethyl-2H-benzo(1,2-C:3,4-C′-5,6-C″) tripyrolium trihydroxide compound/$YO_2$ = 0.05 to 1.0.

* * * * *